United States Patent
Oldendorf

(10) Patent No.: US 6,777,625 B2
(45) Date of Patent: Aug. 17, 2004

(54) BALANCE WITH ANTENNA FOR QUERYING WEIGHED OBJECTS HAVING TRANSPONDERS

(75) Inventor: Christian Oldendorf, Goettingen (DE)

(73) Assignee: Sartorius Aktiengesellschaft, Goettingen (DE)

( * ) Notice: Subject to any disclaimer, the term of this patent is extended or adjusted under 35 U.S.C. 154(b) by 108 days.

(21) Appl. No.: 10/193,139

(22) Filed: Jul. 12, 2002

(65) Prior Publication Data

US 2003/0010541 A1 Jan. 16, 2003

(30) Foreign Application Priority Data

Jul. 13, 2001 (DE) .......................................... 101 34 281

(51) Int. Cl.[7] .......................................... G01G 19/415
(52) U.S. Cl. ................... 177/210 R; 177/262; 177/264; 340/666
(58) Field of Search ............................ 177/210 R, 262, 177/264; 340/666

(56) References Cited

U.S. PATENT DOCUMENTS

| | | | |
|---|---|---|---|
| 4,619,337 A | * 10/1986 | Behrend et al. | ........ 177/210 R |
| 5,119,894 A | * 6/1992 | Crawford et al. | ........... 177/145 |
| 5,629,498 A | * 5/1997 | Pollock et al. | ................ 177/15 |
| 5,923,001 A | * 7/1999 | Morris et al. | ............... 177/245 |
| 6,015,163 A | * 1/2000 | Langford et al. | ....... 177/210 R |
| 6,191,691 B1 | * 2/2001 | Serrault | ................... 340/572.8 |
| 6,302,461 B1 | * 10/2001 | Debras et al. | .............. 177/139 |

FOREIGN PATENT DOCUMENTS

DE          299 14 925 U1     12/1999

* cited by examiner

Primary Examiner—Randy W. Gibson
(74) Attorney, Agent, or Firm—Sughrue Mion, PLLC

(57) ABSTRACT

A balance including a weighing pan (2; 32), a weigh sensor (8; 38) with a housing (1; 31) enclosing the weigh sensor, and an antenna (7; 37) configured to communicate with a transponder (4) that is, e.g., associated with or attached to an object being weighed (3). The antenna (7; 37) is arranged in a horizontal plane in or below the weighing pan (2; 32) and the weighing pan is preferably made of an electrically poorly conductive material. As a result, the antenna is almost invisibly integrated in the balance and does not interfere with the placement of the objects being weighed on the balance.

17 Claims, 3 Drawing Sheets

US 6,777,625 B2

BALANCE WITH ANTENNA FOR QUERYING WEIGHED OBJECTS HAVING TRANSPONDERS

The following disclosure is based on German Application No. 101 34 281.0, filed on Jul. 13, 2001, which is incorporated into this application by reference.

FIELD OF AND BACKGROUND OF THE INVENTION

The invention relates to a balance having a weighing pan, a weighing sensor, a housing that encloses said weighing sensor, and an antenna for identifying an object being weighed that is equipped with a transponder.

Balances of this type are known, for instance, from German Utility Model DE 299 14 925 U1. In the device described in that document, the antenna is arranged in a vertical plane, laterally above the weighing pan. This arrangement, however, limits the maximum size of the object to be weighed, since the antenna acts as a lateral stop, so that large objects to be weighed cannot be pushed far enough onto the weighing pan. If the objects to be weighed are small, the lateral arrangement of the antenna has the effect that the objects tend to be placed near the antenna and thus off center on the weighing pan. This results in eccentric load errors if the balance is not perfectly adjusted for eccentric loading.

OBJECTS OF THE INVENTION

Thus, one object of the invention is to provide an antenna arrangement that is suitable for both small and large objects to be weighed.

SUMMARY OF THE INVENTION

This and other objects are attained by arranging the antenna in a horizontal plane in or below the weighing pan and by making the weighing pan of an electrically poorly conductive material. According to one formulation, the invention provides a balance that includes a weighing pan; a weigh sensor; a housing enclosing the weigh sensor; and an antenna identifying an object being weighed that is equipped with a transponder. The antenna is arranged in a horizontal plane in or below the weighing pan, and the weighing pan is made of an electrically poorly conductive material.

According to another formulation, the invention is directed to a weighing system that includes: a balance having a weigh sensor; a housing that houses the weigh sensor; and a weighing pan having no more than low electrical conductivity; and an object having a transponder. The balance additionally includes an antenna that has high electrical conductivity and communicates with the transponder. At least an upper surface of the weighing pan is interposed between the antenna and the object Due to the horizontal antenna arrangement in or below the weighing pan, the size of the object to be weighed is not limited. Even if the objects being weighed are small, the operator of the balance will intuitively place the object in the center of the weighing pan. This antenna arrangement is made possible because the weighing pan is made of an electrically poorly conductive material. Conventional metallic weighing pans would excessively attenuate the antenna in this arrangement. On the other hand, a small residual conductivity of the weighing pan is preferred, since it prevents electrostatic charging of the weighing pan and the object being weighed.

BRIEF DESCRIPTION OF THE DRAWINGS

The invention as well as advantageous refinements thereof will now be described in greater detail with reference to schematic drawings in which.

DETAILED DESCRIPTION OF THE PREFERRED EMBODIMENTS

Figure 1:
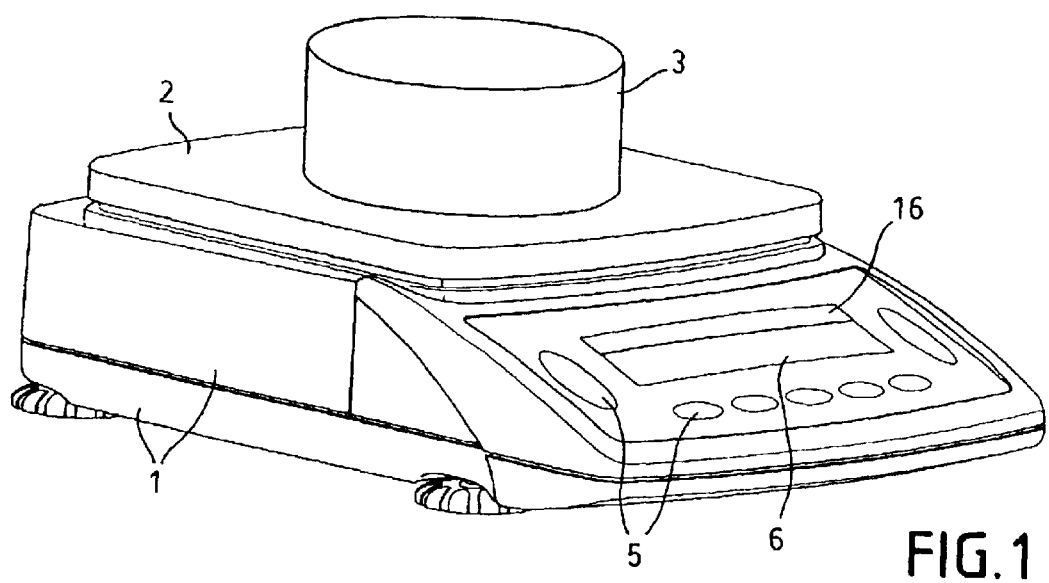
FIG. 1 is a perspective view of a first embodiment of the balance.
Figure 2:
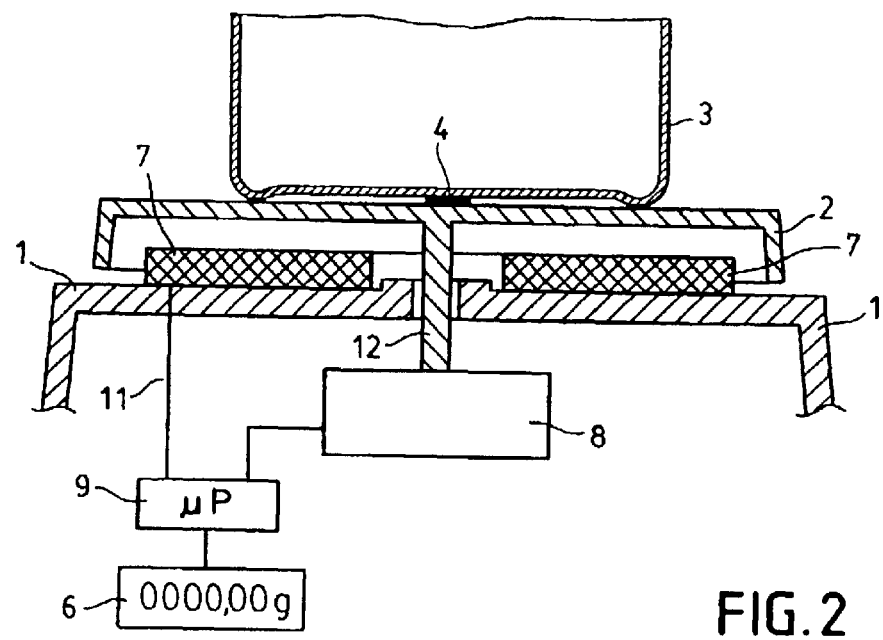
FIG. 2 is a vertical section through the balance shown in FIG. 1.

A first embodiment of the balance is depicted in FIGS. 1 and 2. The perspective view of FIG. 1 shows a balance housing 1, a weighing pan 2 with an object 3 to be weighed placed thereon, a display 6, and control buttons 5. Balances of this type are generally known, so that there is no need to describe their construction and function in detail. Novel aspects of the balance according to the invention are recognizable in the sectional view of FIG. 2. There, an antenna 7 is shown on the upper side of housing 1 is hidden underneath the weighing pan 2. In addition, a transponder 4 is attached to the underside of weighed object 3. The weighing pan 2 is furthermore made of an electrically poorly conductive material. Conventional metal pans would completely shield the antenna in upward direction. The electrically poorly conductive material of weighing pan 2 prevents this shielding effect. There is nevertheless preferably a small amount of residual electrical conductivity, so that electrostatic charging of the weighing pan and consequently the weighed object is avoided. For the sake of clarity in FIG. 2, the electrical connection of antenna 7 is only schematically indicated at 11. The weigh sensor 8, which incorporates a load sensor and on which the weighing pan 2 is supported via a pin 12, is also only schematically indicated. The weighing result of weigh sensor 8 is further processed in an electronic unit 9 of the balance and then sent to display 6. Electronic unit 9 also controls antenna 7 as a transmitting or receiving antenna.

If antenna 7 transmits a high frequency signal as a query signal, this signal is received by transponder 4. Transponder 4 replies in known manner with a coded reply signal, which includes the data stored in the transponder. Antenna 7 receives this reply signal and feeds it to electronic unit 9. Analogously, the electronic unit can use a coded storage signal for newly storing or changing data in transponder 4. Persons skilled in the art will be familiar with the details of electronic communication with transponders, so that further explanations may be omitted here.

The data stored in the transponder can include, for instance:

the tare value of the container the weight of an individual unit for unit counting applications for differential weighing, the sample weight at the beginning of the process identification numbers the chemical name of the substance in the container (this name can, for instance, be displayed in the upper line 16 of the balance display, for control purposes), for long-term measurements, all old measurement results If the balance has a configuration menu, the transponder can also store data that changes the balance settings utilizing this configuration menu. In counting balances, used in unit counting applications, it is possible, for instance, to select a longer integration time for small single weights than for large single weights. This intervention in the configuration menu can also be used, for instance, to enter quickly and conveniently a personal setting for each user of the balance. For this purpose, each user of the balance is given a transponder in which his/her personal configuration for the balance is stored. If the transponder is flat, it can, for instance, be pasted to or integrated in an ID card. Each user can then set the balance to his/her usual configuration by placing the ID card onto the weighing pan. This is advantageous particularly in laboratories with a large number of balances and many users. Each user can use any balance that is free and set it to his/her usual configuration simply by placing the ID card on it.

The described applications are of course only examples, all of which can be realized with the described hardware. Other applications will be apparent to those skilled in the art and are encompassed by the present invention.

Figure 3:
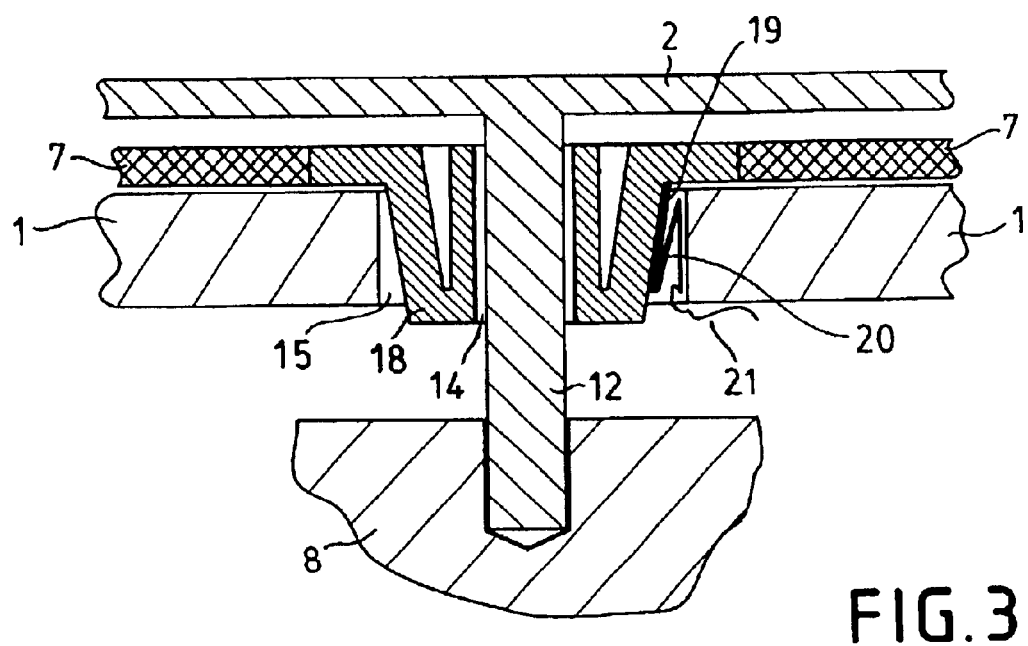
FIG. 3 is a vertical section through a second embodiment of the balance.

FIG. 3 shows a vertical section through a second embodiment of the balance. Parts that are identical to those depicted in FIG. 2 are provided with the same reference numerals and will not be described again here. FIG. 3 illustrates one arrangement by which antenna 7 can be detachably fixed to housing 1 of the balance. For this purpose, the antenna is provided with a central connector 18, which fits into an opening 15 in housing 1. Connector 18 has a plurality of contacts 19 along its periphery (only one of which is visible in FIG. 3), which establish the electrical connection with electrical counter-contacts 20 along the periphery of the housing opening. The connecting leads 21, which continue in the balance housing to the electronic unit, are only schematically indicated in FIG. 3. The connector 18 is further provided with a hole 14 in its center through which pin 12 of weighing pan 2 fits without physically contact it. With this construction, antenna 7 can be easily removed from balance housing 1—e.g. to clean the balance housing. When the antenna is placed back in position, the electrical connection is automatically reestablished. This also provides a simple way to upgrade balances with an antenna for transponders.

Figure 4:
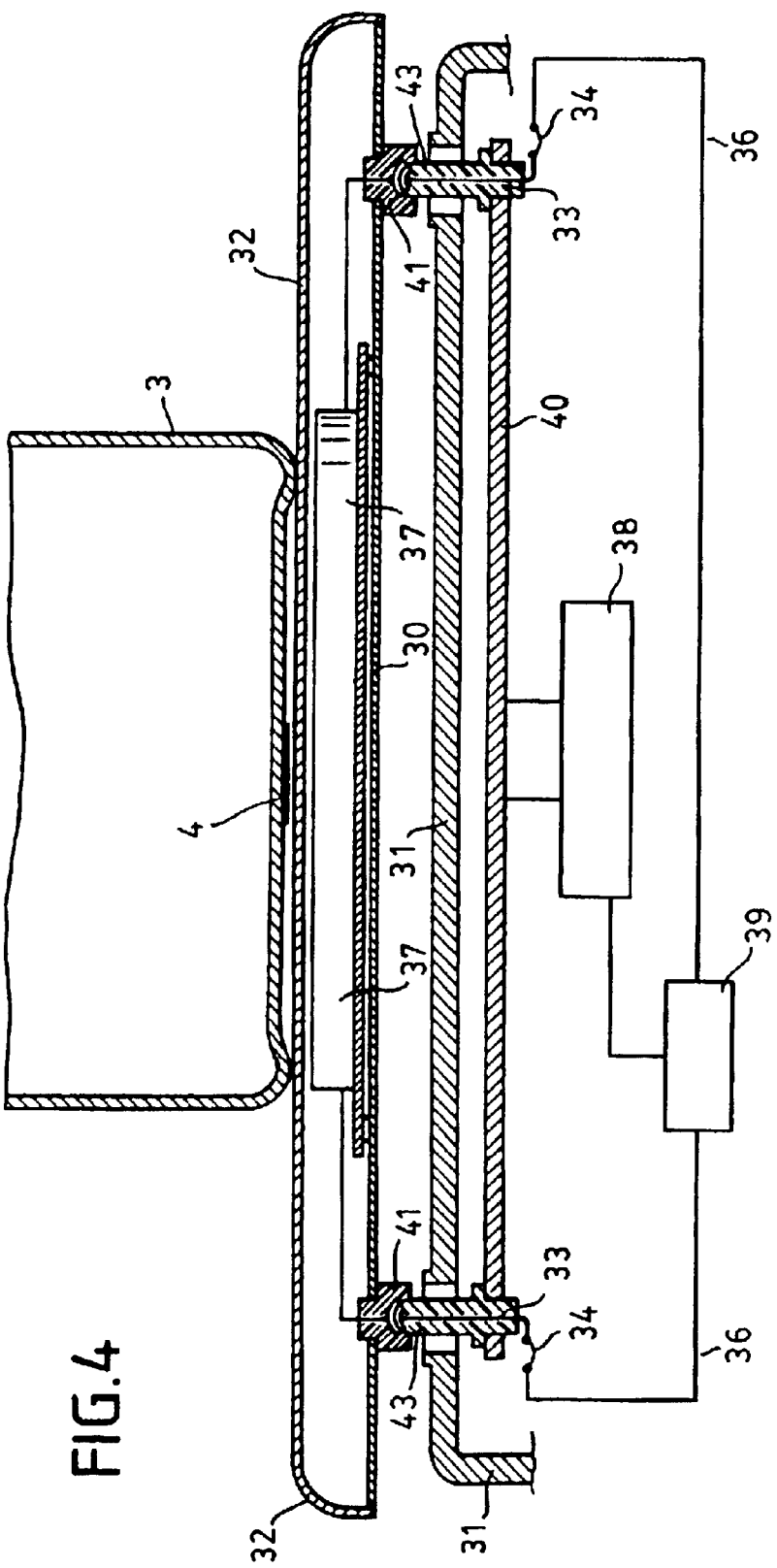
FIG. 4 is a vertical section through a third embodiment of the balance.

FIG. 4 is a vertical section through a third embodiment of the balance. In this embodiment, antenna 37 is mounted to a plate 30 below weighing pan 32. Weighing pan 32, together with plate 30, is supported via insulating rubber buffers 43 and likewise insulating counterparts 41 against a cross member 40 of the housing 31. The cross member 40, in turn, is supported on weigh sensor 38. Power from electronic unit 39 to antenna 37 is supplied by wires 36 fixed to the housing, via flexible connections 34, via current bushings 33 in the interior of insulating rubber buffers 43 and via current bushings in insulating counterparts 41. Current bushings 33 in the interior of rubber buffer 43 end in contact plates on their upper side. Similarly, counterparts 41 carry contact plates on their lower side. This construction of the power supply leads makes it possible to lift the weighing pan 32 (including plate 30), for instance, to clean it. When the weighing pan is replaced, the electrical connection to antenna 37 is automatically reestablished.

The material of weighing pan 32 and of plate 30 is again electrically poorly conductive. The (high-resistance) grounding of the weighing pan and plate is ensured by a third current bushing (not depicted in FIG. 4), the construction of which is essentially the same as that of the two bushings described for antenna 7.

The weighing pan 32 in FIG. 4 can of course also be made removable from plate 30. In this case, plate 30 becomes a separate bottom pan. Antenna 37 can then be fixed either to the underside of the weighing pan 32 or to the bottom pan.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Balance comprising:
   a weighing pan;
   a weigh sensor;
   a housing enclosing said weigh sensor; and
   an antenna for identifying an object being weighed that is equipped with a transponder, wherein said antenna is arranged in horizontal plane in or below said weighing pan, and wherein said weighing pan is made fan electrically poorly conductive material.

2. Balance as claimed in claim 1, wherein said antenna is arranged on the underside of said weighing pan.

3. Balance as claimed in claim 1, wherein said antenna is arranged on the upper side of said housing below said weighing pan.

4. Balance as claimed in claim 3, further comprising a mechanical connection;
   wherein said antenna comprises a connector with a plurality of contacts;
   wherein said housing comprises counter-contacts on a housing opening, said counter-contacts corresponding to and establishing electrical connection with said plurality of contacts;
   wherein said connector has vertical hole;
   wherein said weigh sensor comprises a load sensor; and
   wherein said mechanical connection extends between said weighing pan and said load sensor and extends through the vertical hole without contacting said connector.

5. Balance as claimed in claim 1, wherein said weighing pan comprises a bottom pan; and wherein said antenna is fixed to said bottom pan.

6. Weighing system, comprising:
   a balance comprising a weigh sensor; a housing that houses said weigh sensor; and a weighing pan having no more than low electrical conductivity; and
   an object comprising a transponder;
   wherein said balance further comprises an antenna having high electrical conductivity and configured to communicate with said transponder, and wherein at least an upper surface of said weighing pan is interposed between said antenna and said object.

7. Weighing system according to claim 6, wherein said antenna is interposed between said weighing pan and said housing.

8. Weighing system according to claim 6, wherein said antenna is incorporated within said weighing pan.

9. Weighing system according to claim 6, wherein said balance further comprises a processor communicating with said antenna; and wherein said transponder, antenna and processor are configured to download data from said transponder to said processor.

10. Weighing system according to claim 9, wherein said processor comprises a configuration menu; and wherein the data includes data that controls said processor to change a configuration parameter in the configuration menu of the balance.

11. Balance as claimed in claim 1, configured to take weight measurements of only vertical loads with the weighing pan oriented horizontally.

12. Balance as claimed in claim 1, comprising manual control buttons and a display mounted to said housing.

13. Balance as claimed in claim 1, wherein said weighing pan, when assembled with the balance, is restricted to a horizontal orientation, said balance operable for weighing objects supported by said weighing an only when said weighing pan is in the horizontal orientation.

14. Weighing system according to claim 6, wherein said object is supported entirely by said weighing pan.

15. Weighing system according to claim 6, wherein the balance is configured to take weight measurements of only vertical loads with the weighing pan oriented horizontally.

16. Weighing system according to claim 6, wherein the balance comprises manual control buttons and a display mounted to said housing.

17. Weighing system according to claim 6, further comprising a horizontal support surface, and wherein the balance comprises feet that support the balance on the horizontal surface.

\* \* \* \* \*